US011925592B1

(12) United States Patent
Huang et al.

(10) Patent No.: US 11,925,592 B1
(45) Date of Patent: Mar. 12, 2024

(54) PENIS MASSAGER

(71) Applicant: Junpeng Wu, Shenzhen (CN)

(72) Inventors: Tenghui Huang, Guangdong (CN); Junpeng Wu, Shenzhen (CN); Zhixu Yang, Guangdong (CN)

(73) Assignee: Junpeng Wu, Shenzhen (CN)

( * ) Notice: Subject to any disclaimer, the term of this patent is extended or adjusted under 35 U.S.C. 154(b) by 0 days.

(21) Appl. No.: 18/202,966

(22) Filed: May 29, 2023

Related U.S. Application Data

(63) Continuation-in-part of application No. 18/119,859, filed on Mar. 10, 2023, now Pat. No. 11,730,665.

(51) Int. Cl.
*A61H 19/00* (2006.01)
*A61H 23/02* (2006.01)

(52) U.S. Cl.
CPC ............. *A61H 19/32* (2013.01); *A61H 23/02* (2013.01); *A61H 2201/0153* (2013.01); *A61H 2201/1215* (2013.01); *A61H 2201/1692* (2013.01); *A61H 2201/5025* (2013.01)

(58) Field of Classification Search
CPC ...................................................... A61H 19/32
See application file for complete search history.

(56) References Cited

U.S. PATENT DOCUMENTS

2021/0128400 A1* 5/2021 Tindal .................... A61H 19/32
2023/0083660 A1* 3/2023 Raju ...................... A61H 23/00
2023/0126338 A1* 4/2023 Shao ................. A61H 15/0078
600/38

FOREIGN PATENT DOCUMENTS

DE 202017005314 U1 * 2/2018

* cited by examiner

*Primary Examiner* — Thaddeus B Cox

(57) ABSTRACT

A penis massager includes a housing defining a first space and a second space therein, a sleeve provided in the first space of the housing, a driving motor mounted in the second space of the housing, and at least two handles extending outwardly from an outer face of the housing for holding of the penis massager. The sleeve defines an interior volume for accommodating a penis therein. The driving motor is connected to the sleeve in a transmission way, configured for driving to sleeve to move and/or rotate relative to the housing, thereby providing a massaging stimulation to the penis in the sleeve.

17 Claims, 13 Drawing Sheets

PENIS MASSAGER

CROSS-REFERENCE TO RELATED APPLICATIONS

This application is a continuation-in-part application of application Ser. No. 18/119,859, filed on Mar. 10, 2023, which claims priority to Chinese Patent Application No. 202320430037.2, filed on Mar. 8, 2023. The content of the aforementioned applications, including any intervening amendments thereto, are incorporated herein by reference.

TECHNICAL FIELD

The present application relates to the technical field of massage devices, more particularly relates to a penis massager.

BACKGROUND

Penis massagers are configured for simulating a vaginal environment to allow males, particularly the bachelordom and long-distance separation males, to release their sex pressure.

Generally, the penis massager includes a housing, a soft sleeve mounted in a housing and defining a cavity therein, and a motor configured for driving the sleeve to vibrate in high frequency, thereby providing a massaging stimulation to the penis inserted into the cavity of the soft sleeve. However, a size, especially a radial size of the penis massager is limited by the soft sleeve, and cannot be designed too small, which makes it easy to slip out of the human hand due to vibration, which makes it inconvenient to use.

SUMMARY

An object of the present application is to provide a penis massager which is easy to be held during in use.

In order to achieve the above-mentioned object, the present application provides a penis massager that includes a housing defining a space therein; a sleeve provided in the space of the housing and defining an interior volume for accommodating a penis therein; a driving device for driving the sleeve to generate motion relative to the housing; and at least two handles extending outwardly from an outer face of the housing for holding of the penis massager.

Further, the present application provides a penis massager that includes a housing defining a first space and a second space therein; a sleeve provided in the first space of the housing and defining an interior volume for accommodating a penis therein; a driving motor mounted in the second space of the housing and connected to the sleeve in a transmission way, the driving motor being configured for driving the sleeve to move and/or rotate relative to the housing; and at least two handles extending outwardly from an outer face of the housing for holding of the penis massager.

Compared with the prior art, the penis massager provided by the present application has the beneficial effects that: the penis massager is provided with at least two handles, each handle has a size not limited by that of the sleeve and thus can be designed ergonomically, so that the user holds the handles instead of the housing during in use, even if the sleeve is driven to generate strong motion, the penis massager will not slip out of the hands, which not only facilitates the use of the present penis massager, but also makes the design of the radial size of the sleeve more flexible.

BRIEF DESCRIPTION OF THE DRAWINGS

In order to more clearly explain technical solutions in embodiments of the present application, accompanying drawings required to be used in the embodiments will be briefly introduced below. Apparently, the accompanying drawings in the following description are only some embodiments of the present application. For those ordinarily skilled in the art, other accompanying drawings may be obtained from these accompanying drawings without paying any creative labor.

DESCRIPTION OF THE EMBODIMENTS

In order to make technical problems, technical solutions and beneficial effects to be solved in the present application clearer, the present application will be further described below in detail in conjunction with accompanying drawings and embodiments. It should be understood that specific embodiments described herein are only used to explain the present application and not to limit the present application.

It should be noted that when an element is referred to as “fixed to” or “arranged on” another element, it can be directly or indirectly on another element. When an element is referred to as “connected to” another element, it can be directly or indirectly connected to another element.

It should be understood that the orientational or positional relationship indicated by terms “length”, “width”, “up”, “down”, “front”, “back”, “left”, “right”, “vertical”, “horizontal”, “top”, “bottom”, “inside”, “outside”, and the like is based on the orientational or positional relationship shown in the accompanying drawings, and is only for the sake of describing the present application and simplifying the description instead of indicating or implying that the apparatus or element referred to must have a specific orientation, and must be constructed and operated in a specific orientation, so it cannot be understood as a limitation of the present application.

Also, terms "first" and "second" are only used for describing purposes, and cannot be understood as indicating or implying relative importance or implying the number of technical features indicated. Therefore, features defined with "first" and "second" can explicitly or implicitly include one or more of these features. In the description of the present application, "a plurality of" means two or more, unless otherwise specified.

Referring to FIGS. 1-4, a penis massager according to an embodiment of the present application is shown. In this embodiment, the penis massager includes a housing 10, a sleeve 20 mounted in the housing 10 and a driving device 30 connected to the sleeve 20.

The sleeve 20 defines an interior volume 22 with an open end (such as an open front end) for simulating a vaginal environment, wherein the male genital can be inserted into the interior volume 22 through its open end to simulate sexual intercourse. The driving device 30 is configured for driving the sleeve 20 to generate motion, including but not limited to vibration, rotation, reciprocating movement and the like during the sexual intercourse, thereby producing massaging stimulation on the male genital accommodated in the sleeve 20, helping the user release his sexual pressure and thus satisfying their physiological and psychological needs to a certain extent.

Figure 1:
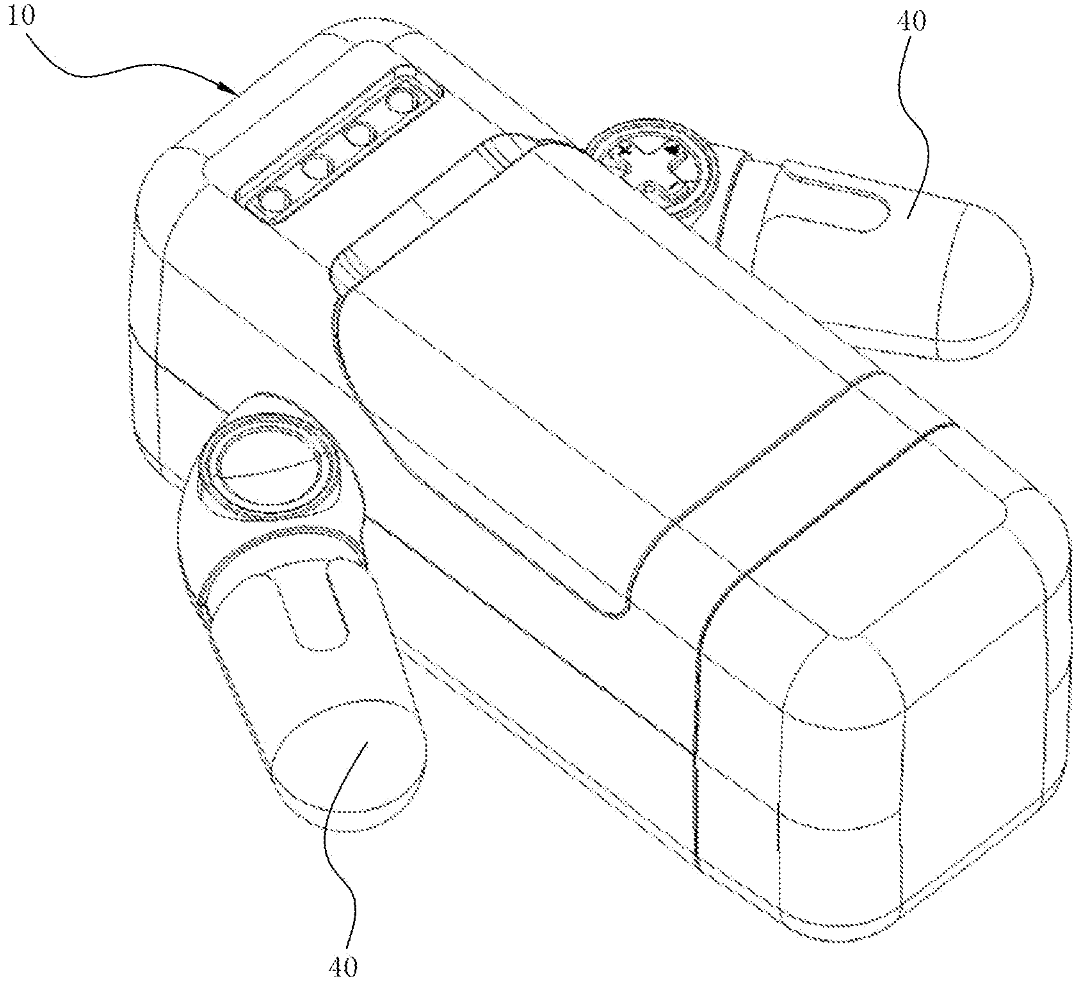
FIG. 1 is a schematic, assembled view of a penis massager according to a first embodiment of the present application.
Figure 2:
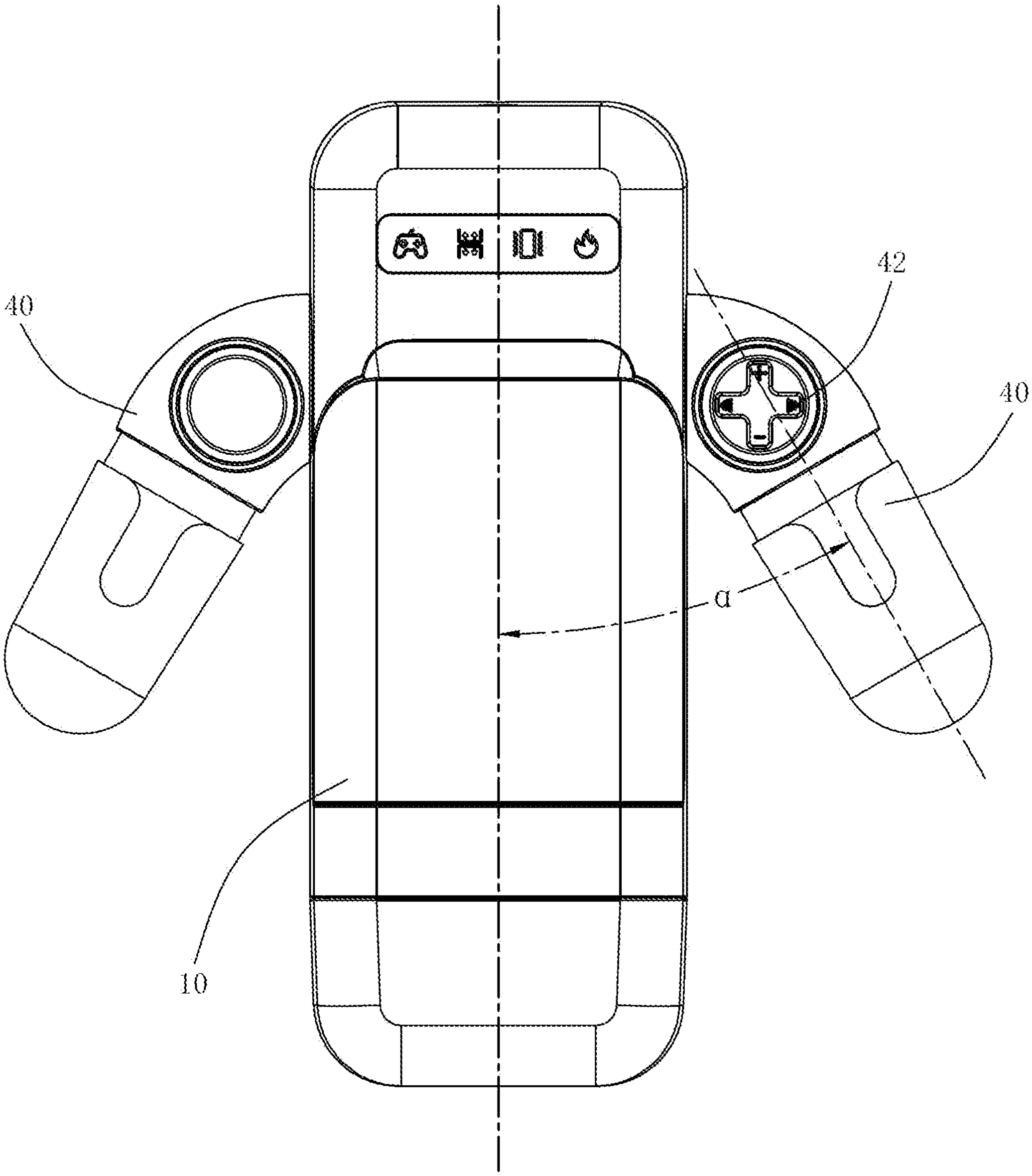
FIG. 2 is a plan view of the penis massager of FIG. 1.
Figure 3:
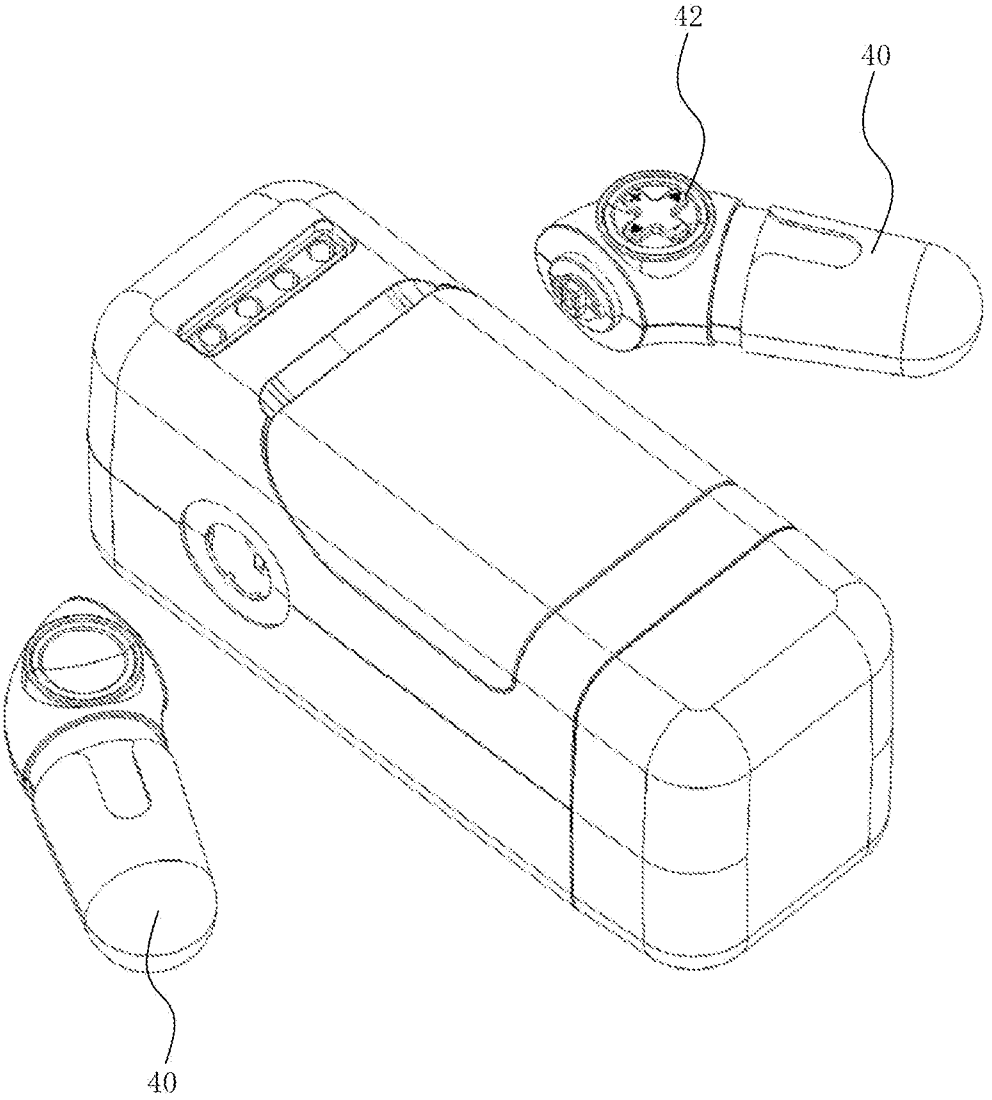
FIG. 3 is an exploded view of the penis massager of FIG. 1.
Figure 4:
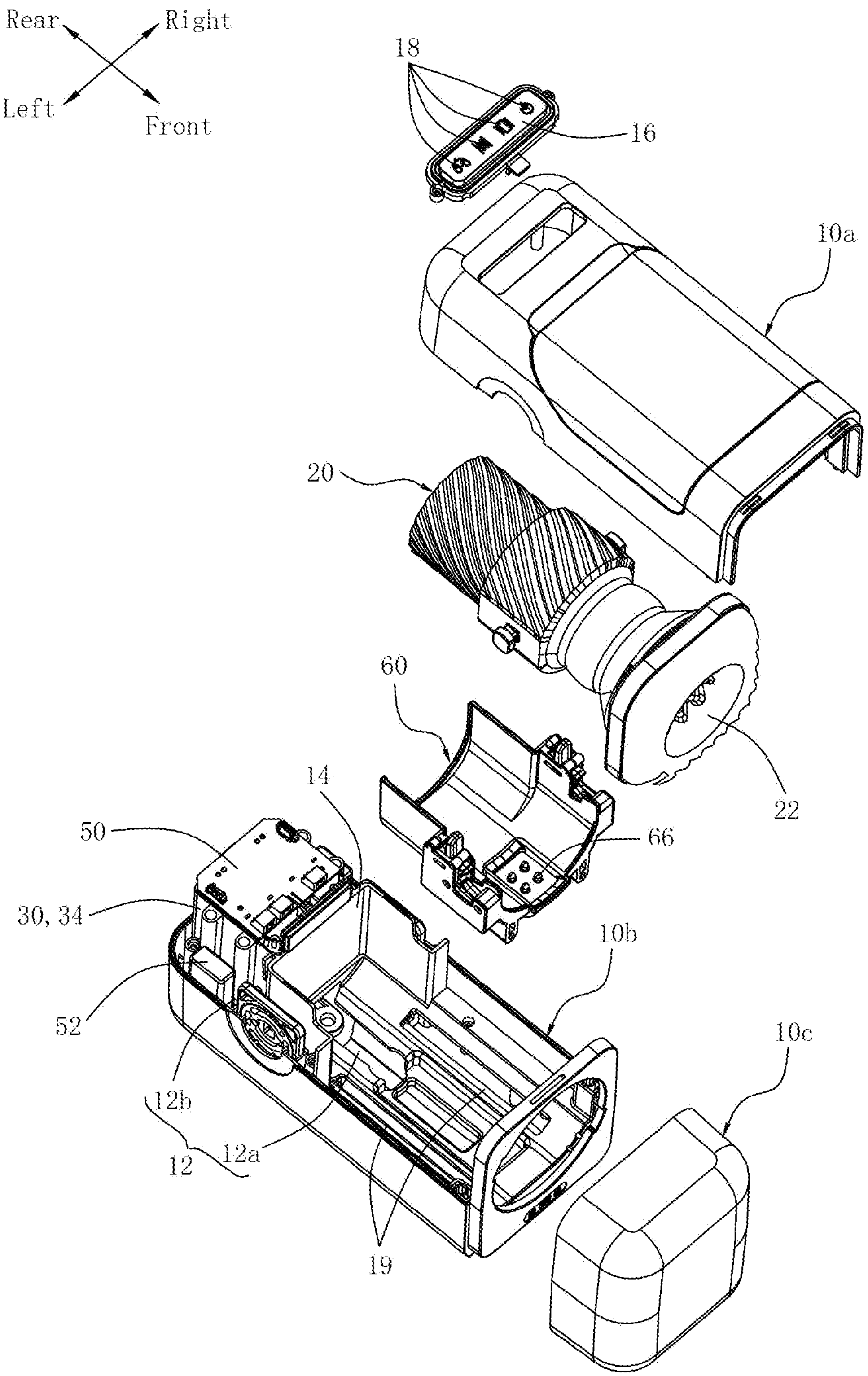
FIG. 4 is a further exploded view of the penis massager of FIG. 1, wherein its handles are removed.

As shown in FIGS. 3-4, Handles 40 are provided on an outer face of the housing 10, preferably the handles 40 are two in number and are arranged symmetrically about a central axis of the housing 10. The handles 40 are designed ergonomically, and are convenient to be held in the user's hands. Accordingly, each handle 40 has a size, especially a radial size, much less than that of the housing 10. Preferably, each handle 40 extends outwardly and obliquely from a corresponding side of the housing 10. That is, the handle 40 is angular with the housing 10, and an inclination angle $\alpha$ of a central axis of the handle 40 relative to that of the housing 10 may be set to range from 0-90 degrees, preferably 30-60 degrees, facilitating holding of the handle 40.

For the housing 10, its size, especially its radial size, largely depends on the size of the sleeve 20 mounted therein, and thus can not be designed too small, which makes the housing 10 not easy to be held by the user's hand, so that the conventional penis massager is easy to slip out of the hand during in use. For the present application, the user holds the handles 40 instead of the housing 10, wherein each handle 40 has a size not limited by that of the sleeve 20, so even if the sleeve 20 is driven to generate strong motion, the penis massager will not slip out of the hands, which not only facilitates the use of the present penis massager, but also makes the design of the radial size of the sleeve 20 more flexible.

Preferably, the handles 40 are provided with buttons 42 for controlling operation of the driving device 30, i.e., controlling operation of the sleeve 20. The buttons 42 may be provided on any one of the handles 40, or may be provided on both of the handles 40. In this embodiment, each handle 40 is generally column-shaped, and includes a first end connected to the housing 10 and a second end away from the housing 10. Preferably, the first end of the handle 40 is connected to an end (such as a rear end) of the housing 10 away from the open end of the sleeve 20. The buttons 42 are provided at the first end of the handle 40, which are easy to be pressed by the user's thumb when the handle 40 are held in the user's hand. Preferably, the second end of the handle 40 is generally dome-shaped. During in use, the dome-shaped second end of the handle 40 abuts the palm of the hand, which is comfortable even for a long time.

In this embodiment, the housing 10 in whole is generally in a shape of a rectangular column. The handles 40 are provided on opposite sides, such as left and right sides of the housing 10, respectively. In other embodiments, the housing 10 may be shaped as a circular column, a hexagonal column and the like, which should not be limited to the specific embodiments. In addition, the shape and size of the handle 40 may be designed according to needs. For example, in an alternative embodiment, the handle 40 may be designed to have a variable diameter or variable length; and, in another embodiment, the handle 40 may be designed to extend curvedly from the housing 10.

In this embodiment, the handles 40 are formed separately and then fixedly assembled to the housing 10. In other embodiments, the handles 40 may be integrally formed with the housing 10 as one piece, thereby simplifying assembly process of the penis massager. It should be understood that the handles 40 are configured for holding the present penis massager, and should not be limited in number. In addition, the handles 40 are not limited to be held by the user's hand during in use, for example, the handles 40 may be inserted into a hole of a fixed supporting member matching with the handles 40, thereby freeing hands of the users.

The housing 10 is generally a hollow structure, and defines a mounting space 12 therein for accommodating the sleeve 20, the driving device 30, and etc. In this embodiment, a partition plate 14 is arranged in the housing 10 and separates the mounting space 12 into a first space 12*a* and a second space 12*b*. The sleeve 20 is mounted in the first space 12*a*; and electronic components, such as a control circuit board 50, is mounted in the second space 12*b* and electrically connected to the driving device 30. A battery 52, preferably a chargeable battery, is arranged in the second space 12*b* and electrically connected to the control circuit board 50 for providing electric power to the driving device 30.

The driving device 30 may be a rotary motor, a linear motor, a vibration motor and the like, or may be any combination of them. In this embodiment, the driving device 30 includes a vibration motor 32, which is preferably embedded in a side wall of the sleeve 20. The vibration motor 32 and the sleeve 20 may be integrally molded by injection to form an integral structure, facilitating cleaning of the sleeve 20.

A control panel 16 is provided on the outer face of the housing 10, and is electrically connected to the control circuit board 50. Several buttons 18 are set on the control panel 16 for controlling operation of the driving device 30. The buttons 18 on the control panel 16 may be power on/off button, function selection button and the like, the buttons 42 on the handle 40 may be +/− button and the like. During in use, the user may press the buttons 18 and 42 to control operation of the driving device 30, such as controlling vibration amplitude and vibration frequency of the vibration motor 32, thereby controlling vibration of the sleeve 20.

Figure 5:
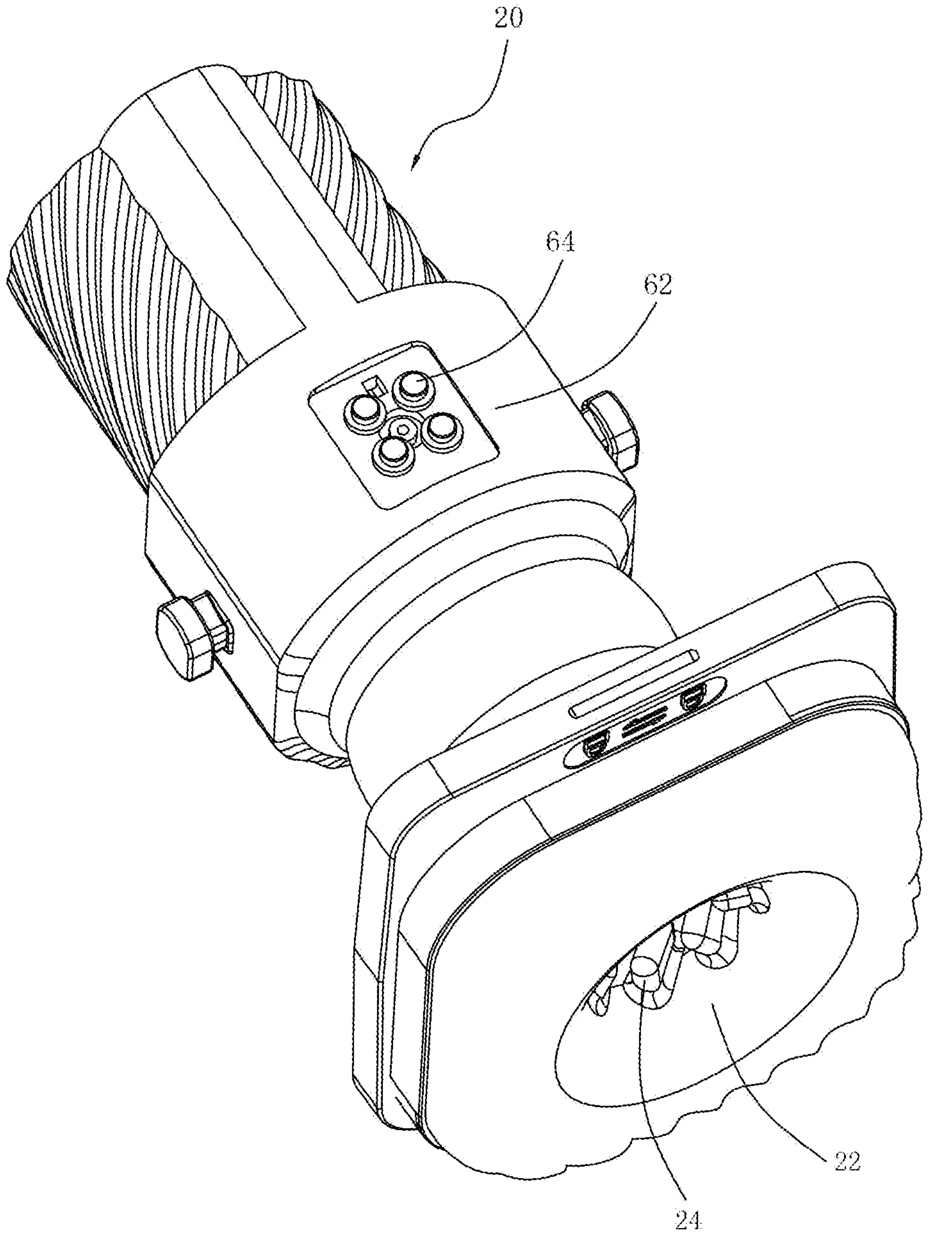
FIG. 5 is a schematic view of a sleeve of the penis massager of FIG. 1.
Figure 6:
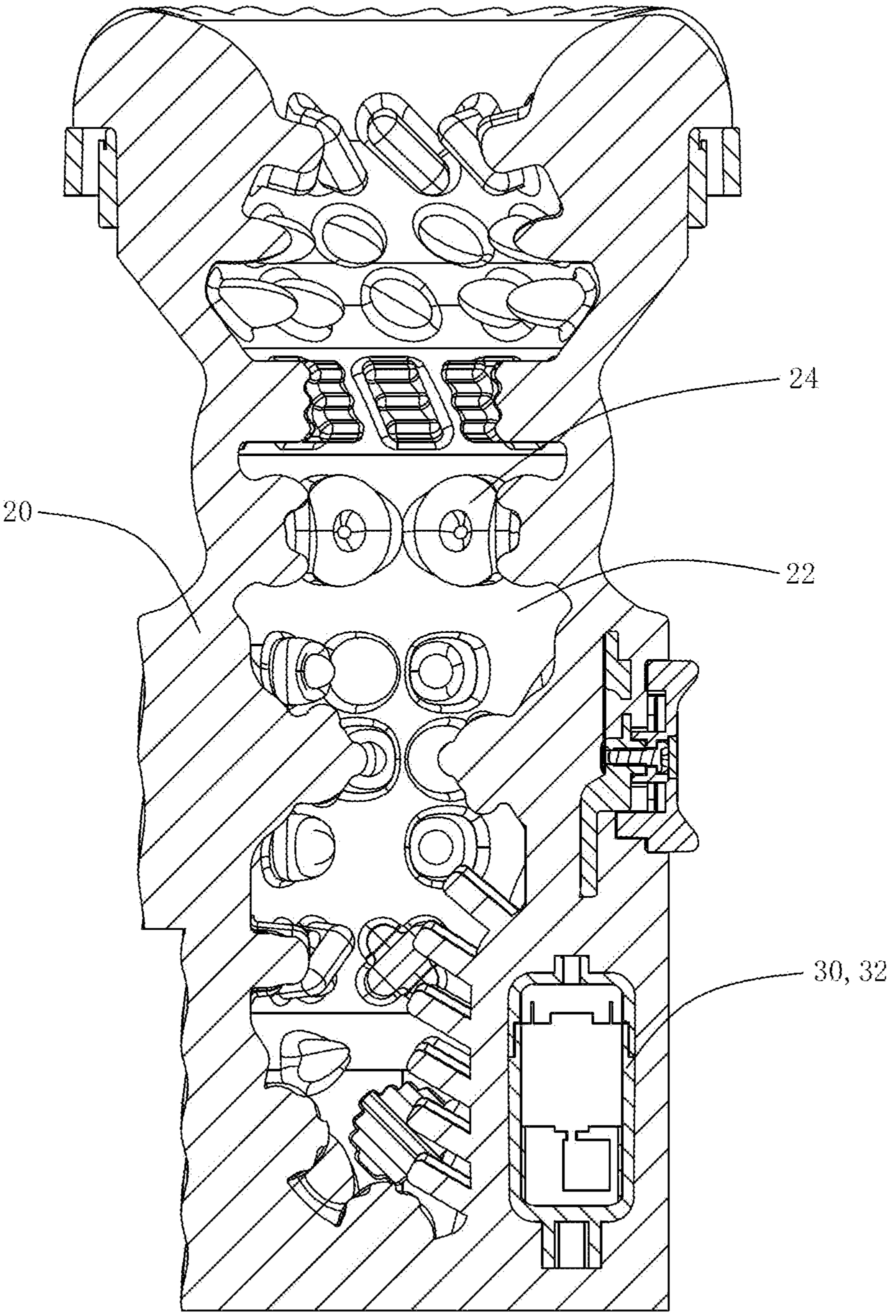
FIG. 6 is a cross sectional view of the sleeve of FIG. 5.

Referring to FIGS. 4-6, the sleeve 20 is made of soft material, such as soft rubber, and preferably is detachably mounted in the first space 12*a* of the housing 10. The interior volume 22 is concaved axially and inwardly from an end of the sleeve 20 away from the second space 12*b*, i.e., the front end of the sleeve 20. Preferably, a plurality of bulges 24 are provided on an interior surface of the sleeve 20 surrounding the interior volume 22 to enhance massage effect to the penis in the sleeve 20.

In this embodiment, the housing 10 includes a top housing 10*a*, a bottom housing 10*b* and an end cover 10*c*. The top housing 10*a* and bottom housing 10*b* are connected to each other to form a cylinder which encircles the sleeve 20, and the end cover 10*c* covers an open side of the cylinder to seal the open end of the interior volume 22 for dust and water proof.

A movable cabin 60 is arranged in the first space 12*a*, and is capable of sliding back and forth along an axial direction of the housing 10. The sleeve 20 is detachably mounted in the movable cabin 60 to move axially along with the movable cabin 60. Preferably, guiding bars 19 are respectively provided on two side, such as left and right sides of the housing 10. The guiding bars 19 extend along the axial direction of the housing 10 and slidably penetrate through the movable cabin 60, thereby guiding the axial movement of the sleeve 20. Thus, the sleeve 20 not only generates vibration, but also produces axial reciprocating movement during in use, providing multiple stimulations on the penis.

In this embodiment, a fixing frame 62 is mounted around and fixed to the sleeve 20. Preferably, the fixing frame 62 and the sleeve 20 are integrally molded by injection. A plurality of first conductive members, such as conductive columns 64, is fixed to and extends outwardly from the fixing frame 62. The vibration motor 32 accommodated in the sleeve 20 is electrically connected to the conductive columns 64. Correspondingly, a plurality of second conductive members, such as pogo pins 66, are provided on the movable cabin 60 and electrically connected to the control circuit board 50. Contact of the conductive columns 64 and the pogo pins 66 realizes electric connection between the vibration motor 32 and the control circuit board 50.

In this embodiment, the driving device 30 may further includes a driving motor 34 for driving the sleeve 20 to do axial reciprocating movement. The driving motor 34 may be arranged in the second space 12*b* of the housing 10, and is connected to the control circuit board 50 electrically and connected to the sleeve 20 by a transmission mechanism. Further, the driving motor 34 may drive the sleeve 20 to rotate in the housing 10 through another transmission mechanism, thus the sleeve 20 is capable of moving axially in the housing 10 and rotating about the axis of the housing 10 at the same time, providing dual stimulation to the penis. In other embodiments, two driving motors may be provided to drive the sleeve 20 to rotate and movement, respectively.

Referring to FIGS. 7-16, a penis massager according to a second embodiment is shown, which differs from the previous embodiment mainly in the handles 40.

Figure 7:
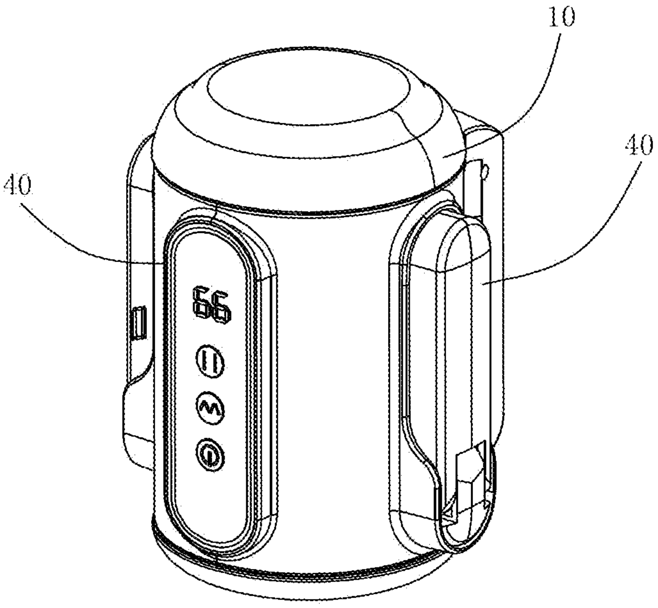
FIG. 7 is a schematic, assembled view of a penis massager according to a second embodiment of the present application, wherein its handles are folded.
Figure 8:
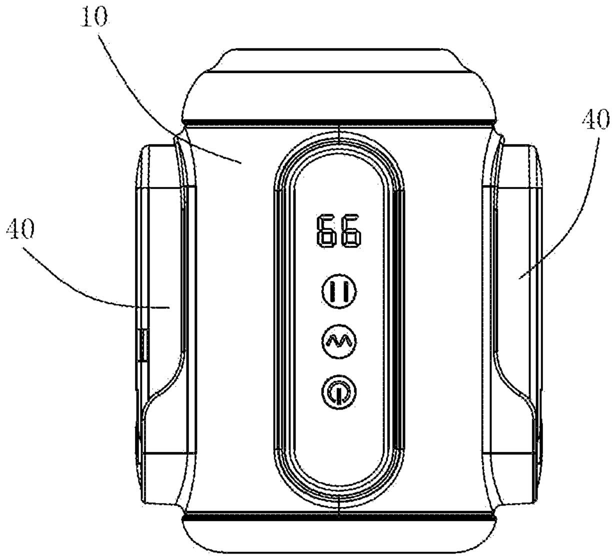
FIG. 8 is a plan view of the penis massager of FIG. 6.
Figure 9:
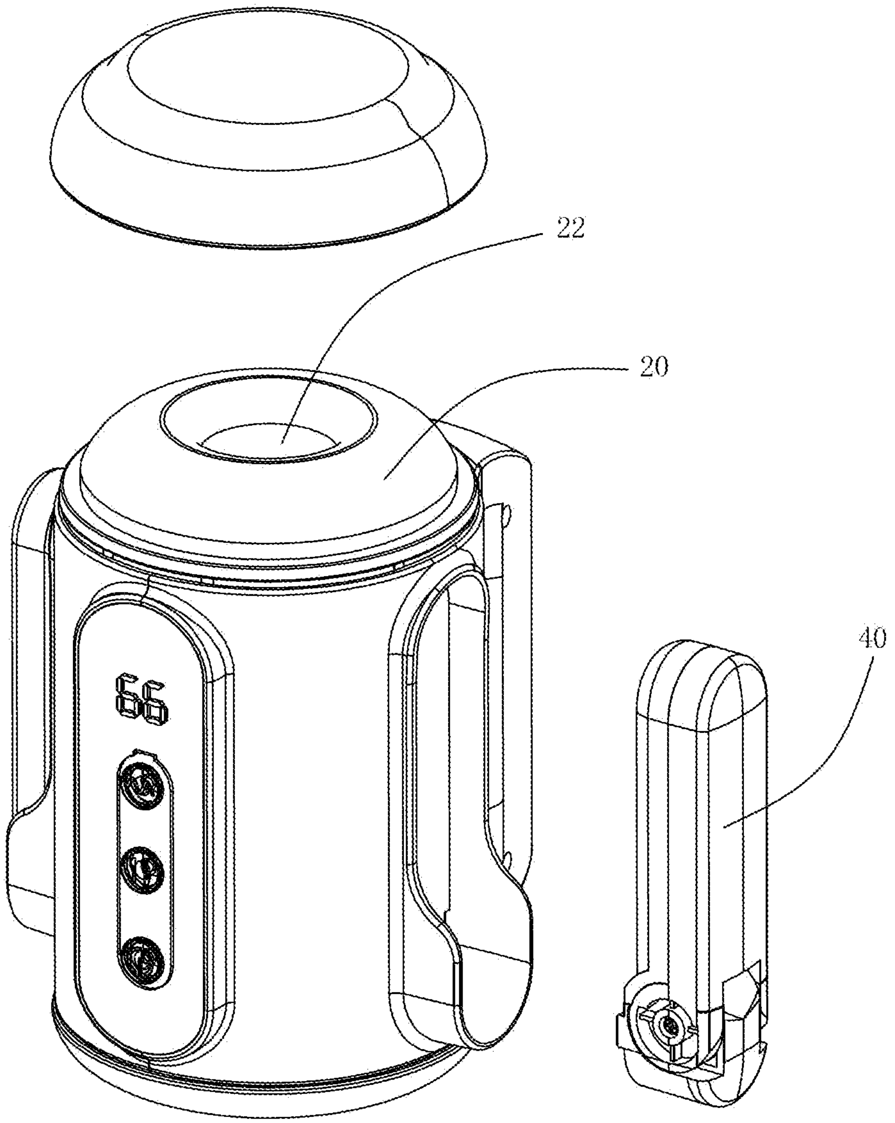
FIG. 9 is an exploded view of the penis massager of FIG. 6.
Figure 10:
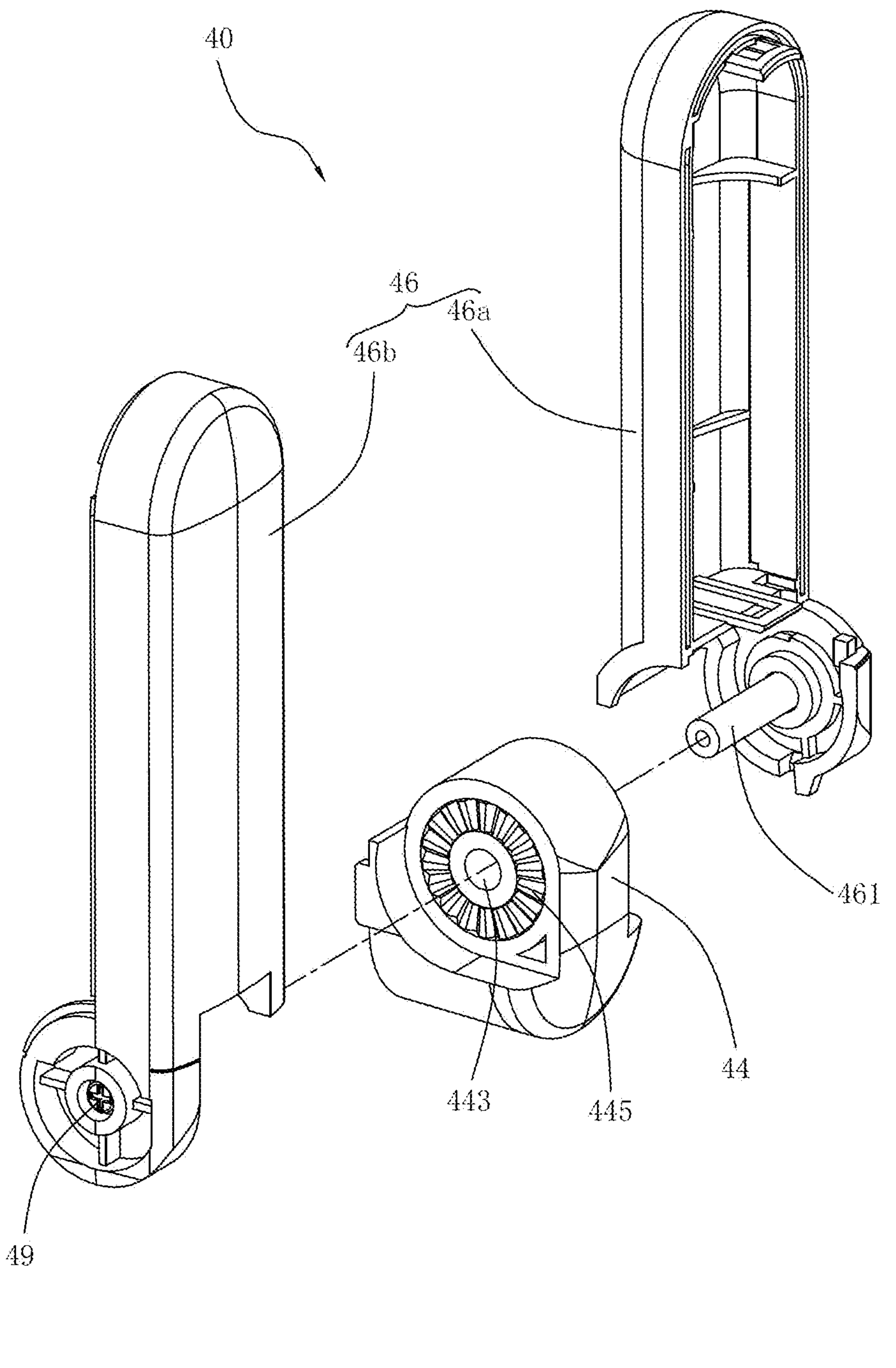
FIG. 10 is an exploded view of the handle of the penis massager of FIG. 6.
Figure 11:
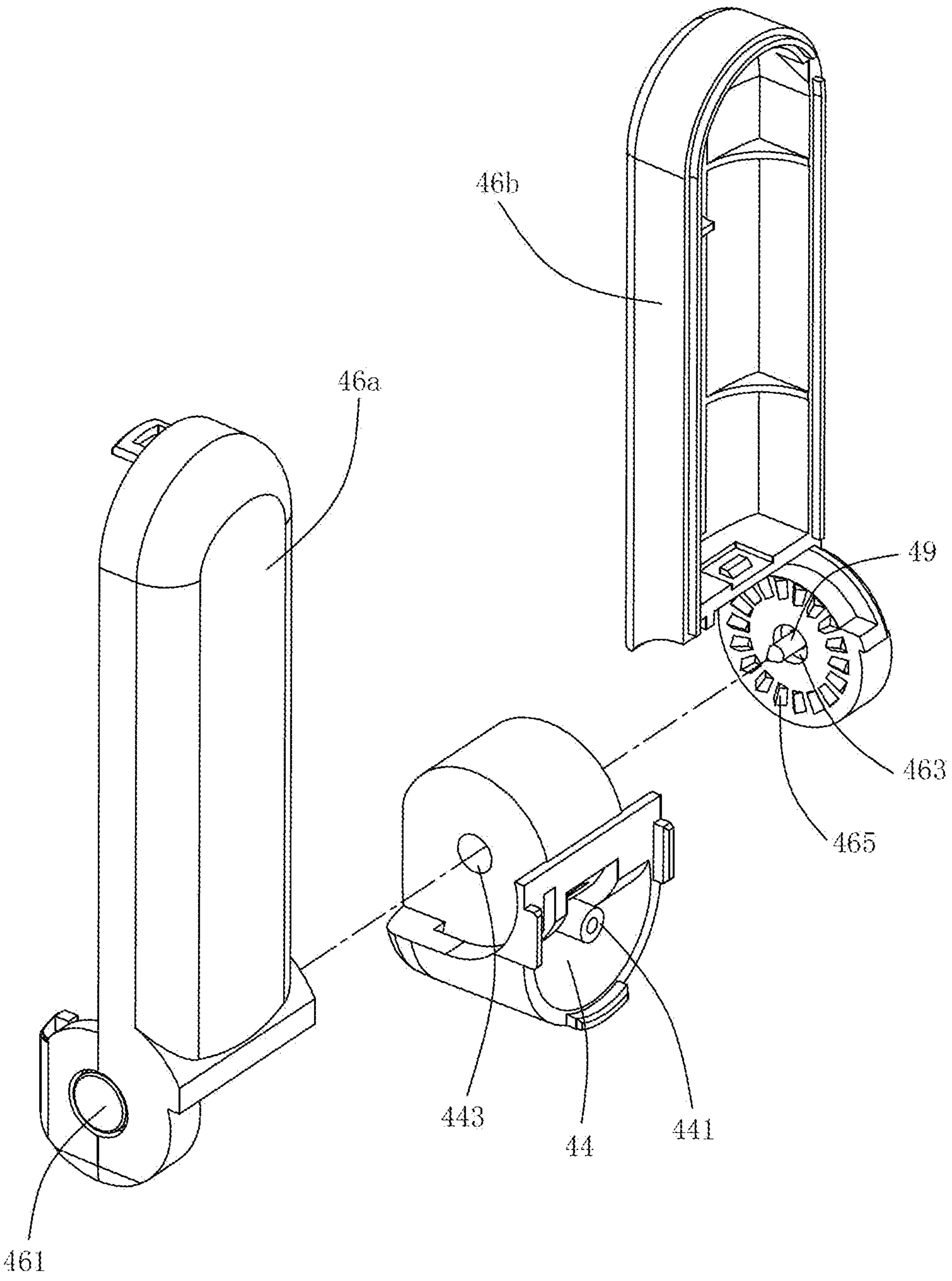
FIG. 11 shows the exploded handle from another aspect.
Figure 12:
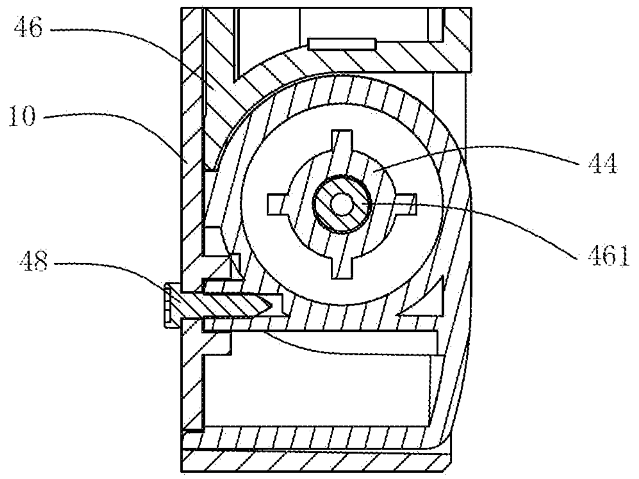
FIG. 12 is a cross sectional view showing connection between the handle and housing of the massager of FIG. 6.
Figure 13:
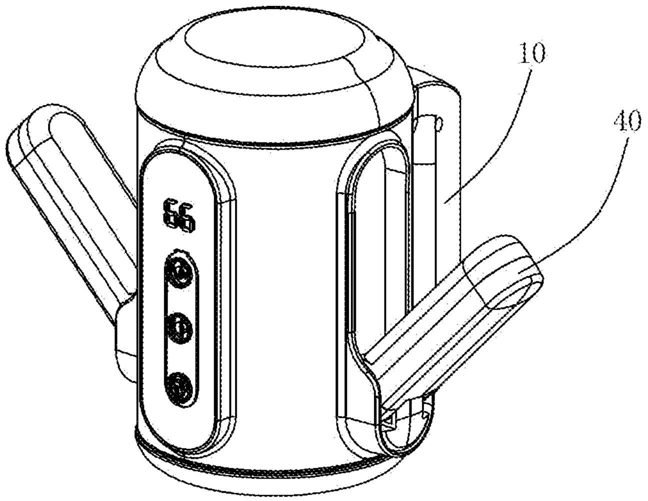
FIG. 13 is a schematic view of the penis massager of FIG. 6, wherein its handles are partly unfolded.
Figure 14:
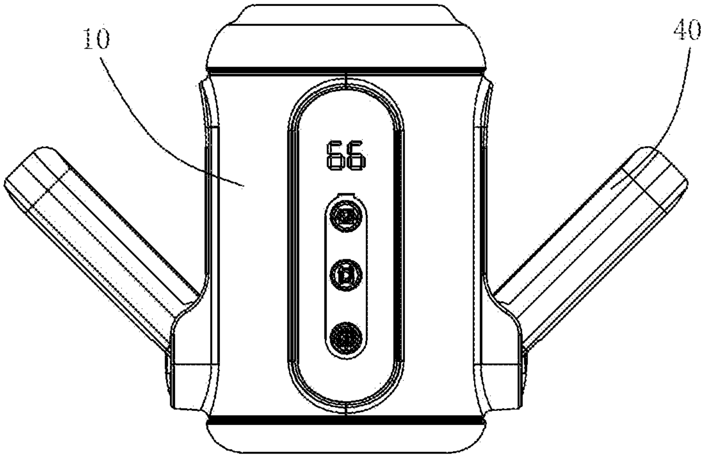
FIG. 14 is a side view of the penis massager of FIG. 13.
Figure 15:
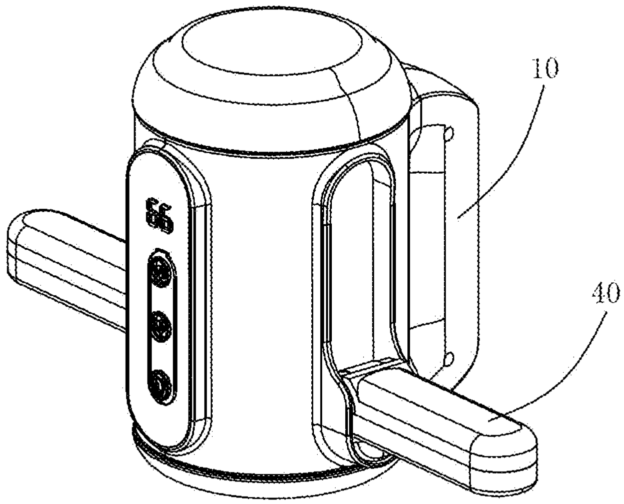
FIG. 15 is a schematic view of the penis massager of FIG. 6, wherein its handles are fully unfolded.
Figure 16:
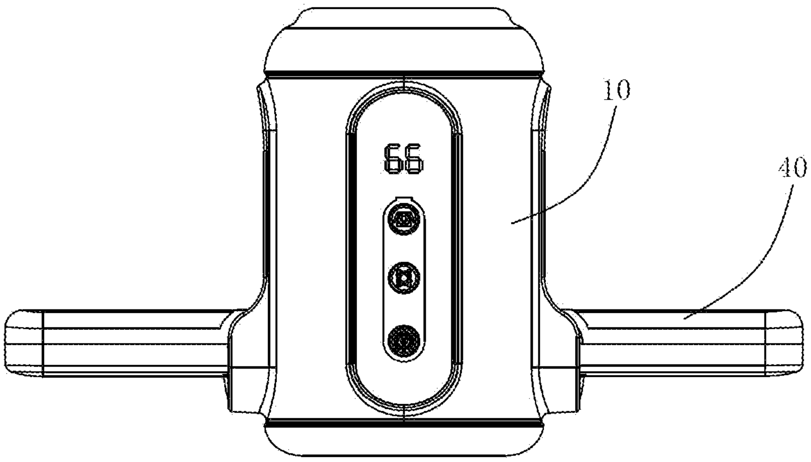
FIG. 16 is a side view of the penis massager of FIG. 15.

In this embodiment, the handles 40 are rotatably connected to the housing 10, and thus the inclination angle $\alpha$ of the central axis of the handle 40 relative to that of the housing 10 can be adjusted according to need, which further facilitates the use of the present penis massager. As shown in FIGS. 7-8, the handles 40 are rotated to a folded state, which attach to the outer face of the housing 10, making the penis massager easy to store and carry. As shown in FIGS. 13-14, each handle 40 is rotated away from the housing 10, which is in a partly unfolded state and its inclination angle $\alpha$ is adjusted to about 45 degrees. As shown in FIGS. 15-16, the handles 40 are totally unfolded, which are generally perpendicular to the housing 10 and the inclination angle $\alpha$ is adjusted to about 90 degrees.

Specifically, as shown in FIGS. 9-12, each handle 40 includes a fixing seat 44 and a rotating arm 46. The fixing seat 44 is fixedly and detachably connected to the housing 10. In this embodiment, the fixing seat 44 forms a cylinder 441 at a side thereof facing to the housing 10, and a fixing component, such as a screw 48, extends through the housing 10 and engages into the cylinder 441 to fix the fixing seat 44 onto the housing 10. The fixing seat 44 defines a shaft hole 443 which extends along a direction parallel to the outer face of the housing 10. The rotating arm 46 is elongated, and includes opposite first and second ends, wherein the first end of the rotating arm 46 is provided with a shaft 461. The shaft 461 is rotatably mounted in the shaft hole 443 of the fixing seat 44 to rotatably connect the handle 40 to the housing 10.

In this embodiment, the rotating arm 46 is molded with two arm portions, i.e., a first arm portion 46*a* and a second arm portion 46*b*. One of the first and second arm portions 46*a*, 46*b* forms the shaft 461, and the other one defines a connecting hole 463. During assembly, the shaft 461 extends through the shaft hole 443 of the fixing seat 44, and a screw 49 extends through the connecting hole 463 and engages into the shaft 461 to fix the first and second arm portions 46*a*, 46*b* together. Preferably, a plurality of first teeth 445 are formed on an axial end face of the fixing seat 44, and a plurality of second teeth 465 are formed on a surface of the first arm portion 46*a* or the second arm portion 46*b* facing towards the first teeth 445. When the inclination angle of the handle 40 needs to be adjusted, a force can be applied to the second end of the rotating arm 46 to rotate it, and the rotating arm 46 can be locked at the required position for the engagement of the first teeth 445 and the second teeth 465.

Figure 17:
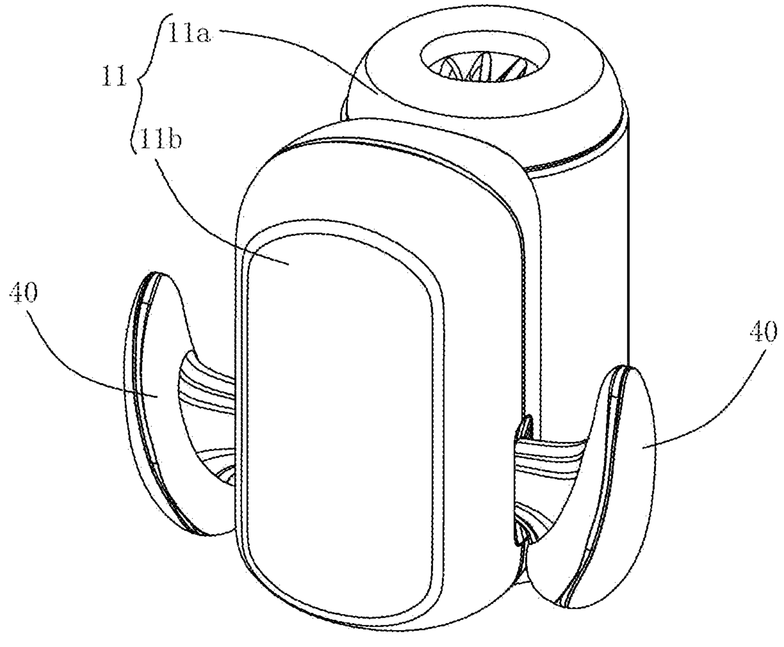
FIG. 17 is a schematic, assembled view of a penis massager according to a third embodiment of the present application.

Referring to FIG. 17, a penis massager according to a third embodiment is shown. In this embodiment, the housing 10 of the penis massager includes a first housing portion 11*a* and a second housing portion 11*b* arranged side by side. The first housing portion 11*a* defines the first space receiving the sleeve 20 therein, and the second housing portion 11*b* defines the second space receiving the driving device 30 therein. In this embodiment, the penis massager has a smaller axial length. Handles 40 are provided at opposites sides of the second housing portion 11*b*, and extend curvedly and outwardly from the second housing portion 11*b*. The handles 40 may be fixed to the housing 10, or rotatably connected to the housing 10, or slidably connected to the housing 10.

Compared with the prior art, the penis massager provided by the present application has the beneficial effects that: the penis massager is provided with at least two handles 40, each handle 40 has a size not limited by that of the sleeve 20 and thus can be designed ergonomically, so that the user holds the handles 40 instead of the housing 10 during in use, even if the sleeve 20 is driven to generate strong motion, including but not limited to vibration, rotation, reciprocating movement and the like, the penis massager will be held in the hands tightly and not slip out of the hands, which not only facilitates the use of the present penis massager, but also makes the design of the radial size of the sleeve 20 more flexible.

The above is only a better embodiment of the present application and is not intended to limit the present application. Any modification, equivalent replacement and improvement made within the spirit and principle of the present application shall be included in a scope of protection of the present application.

What is claimed is:

1. A penis massager, comprising:

a housing defining a space therein;

a sleeve provided in the space of the housing and defining an interior volume for accommodating a penis therein;

a driving device for driving the sleeve to generate motion relative to the housing; and at least two handles extending outwardly from an outer circumferential face of the housing for holding of the penis massager, wherein each of the at least two handles comprises a first end and a second end, the first end of each of the at least two handles is connected to an end of the housing away from an open end of the sleeve, and the second end of each of the at least two handles extends away from the housing; and at least one button being provided on the first end of at least one of the at least two handles.

2. The penis massager according to claim 1, wherein the second end of each of the at least two handles is substantially dome-shaped.

3. The penis massager according to claim 1, wherein the at least two handles are detachably connected to the housing.

4. The penis massager according to claim 1, wherein the at least two handles are slidably connected to the housing.

5. The penis massager according to claim 1, wherein the at least two handles are rotatably connected to the housing.

6. The penis massager according to claim 5, wherein each of the at least two handles comprises a fixing seat fixedly connected to the housing and a rotating arm, one of the fixing seat and the rotating arm defining a shaft hole therein, and the other one of the fixing seat and the rotating arm comprising a shaft being rotatably inserted into the shaft hole.

7. The penis massager according to claim 6, wherein the fixing seat forms a plurality of first teeth at an axial end face thereof, the rotating arm forms a plurality of second teeth at a surface thereof facing towards the plurality of first teeth, and the plurality of first teeth and the plurality of second teeth mesh with each other.

8. The penis massager according to claim 1, wherein the driving device comprises a vibration motor embedded in the sleeve.

9. The penis massager according to claim 8, wherein the driving device further comprises a driving motor for driving the sleeve to rotate relative to the housing.

10. The penis massager according to claim 8, wherein the driving device further comprises a driving motor for driving the sleeve to do reciprocating axial movement relative to the housing.

11. The penis massager according to claim 10, wherein a movable cabin is movably mounted in the space of the housing, the sleeve is detachably mounted into the movable cabin, and guiding bars are provided in the housing for guiding axial movement of the movable cabin and the sleeve.

12. The penis massager according to claim 11, wherein a fixing frame is arranged around the sleeve, a plurality of first conductive members is provided on the fixing frame and connected to the vibration motor electrically, and a plurality of second conductive members is provided on the movable cabin and contacts with the first conductive members.

13. The penis massager according to claim 1, wherein a plurality of bulges is provided on an interior surface of the sleeve surrounding the interior volume.

14. A penis massager, comprising:

a housing defining a space therein;

a sleeve provided in the space of the housing and defining an interior volume for accommodating a penis therein;

a driving device for driving the sleeve to generate motion relative to the housing; and at least two handles extending outwardly from an outer face of the housing for holding of the penis massager;

wherein the at least two handles are slidably connected to the housing.

15. A penis massager, comprising:

a housing defining a space therein;

a sleeve provided in the space of the housing and defining an interior volume for accommodating a penis therein;

a driving device for driving the sleeve to generate motion relative to the housing; and at least two handles extending outwardly from an outer face of the housing for holding of the penis massager;

wherein the at least two handles are rotatably connected to the housing.

16. The penis massager according to claim 15, wherein each of the at least two handles comprises a fixing seat fixedly connected to the housing and a rotating arm, one of the fixing seat and the rotating arm defining a shaft hole therein, and the other one of the fixing seat and the rotating arm comprising a shaft being rotatably inserted into the shaft hole.

17. The penis massager according to claim 16, wherein the fixing seat forms a plurality of first teeth at an axial end face thereof, the rotating arm forms a plurality of second teeth at a surface thereof facing towards the plurality of first teeth, and the plurality of first teeth and the plurality of second teeth mesh with each other.

* * * * *